Jan. 17, 1950   H. C. PAULSEN   2,494,578
MACHINE FOR USE IN THE MANUFACTURE OF INSOLES
Filed March 5, 1948   7 Sheets-Sheet 4
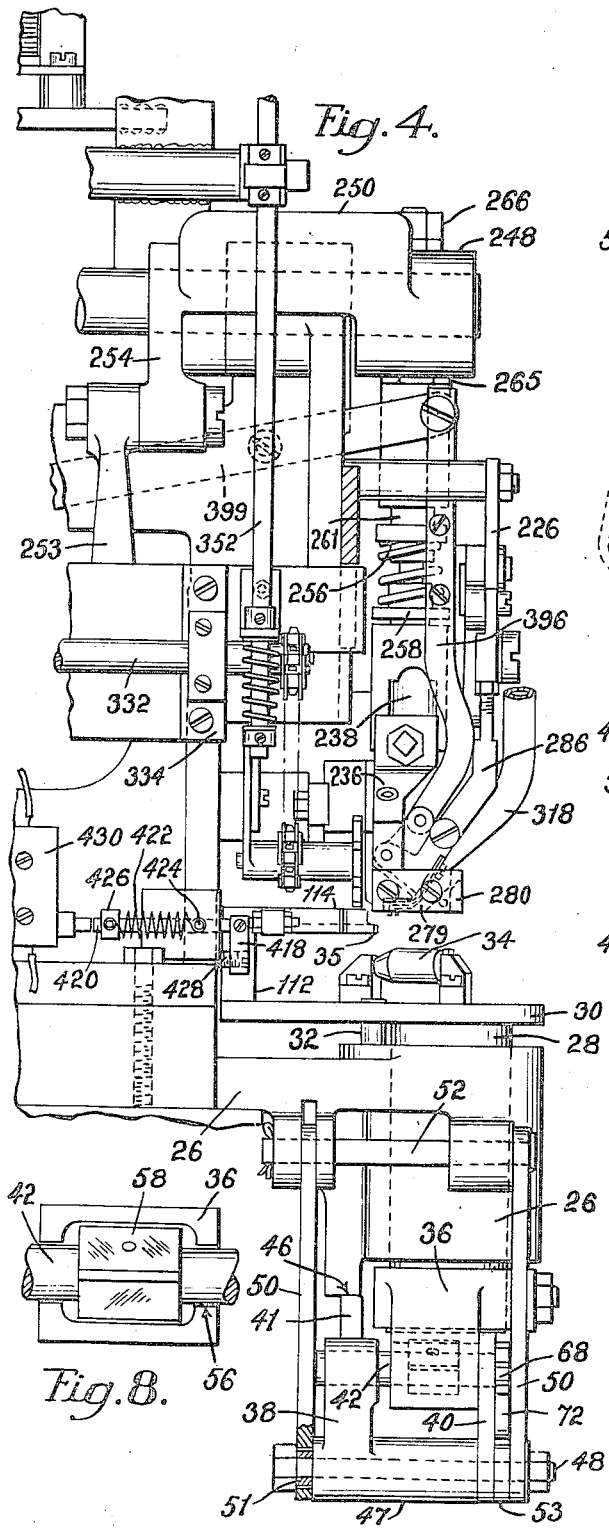
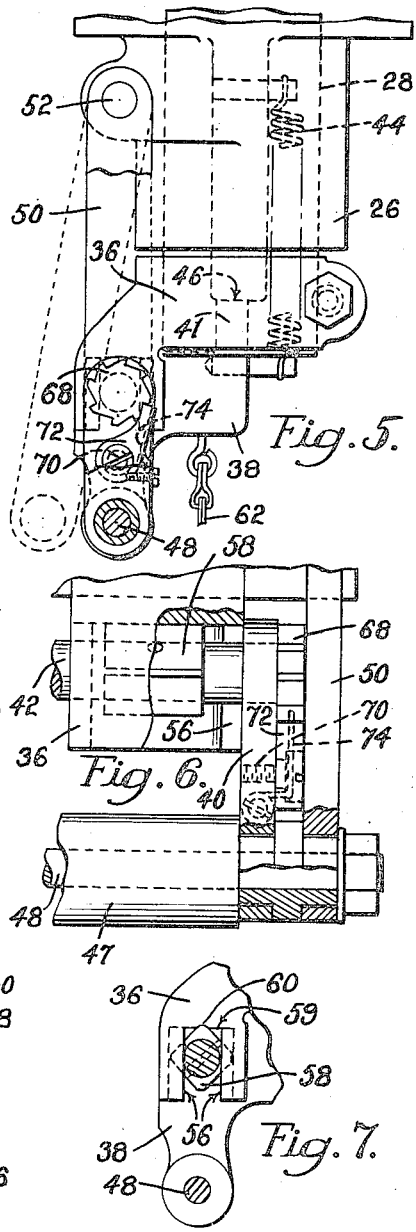
Inventor
Hans C. Paulsen
By his Attorney

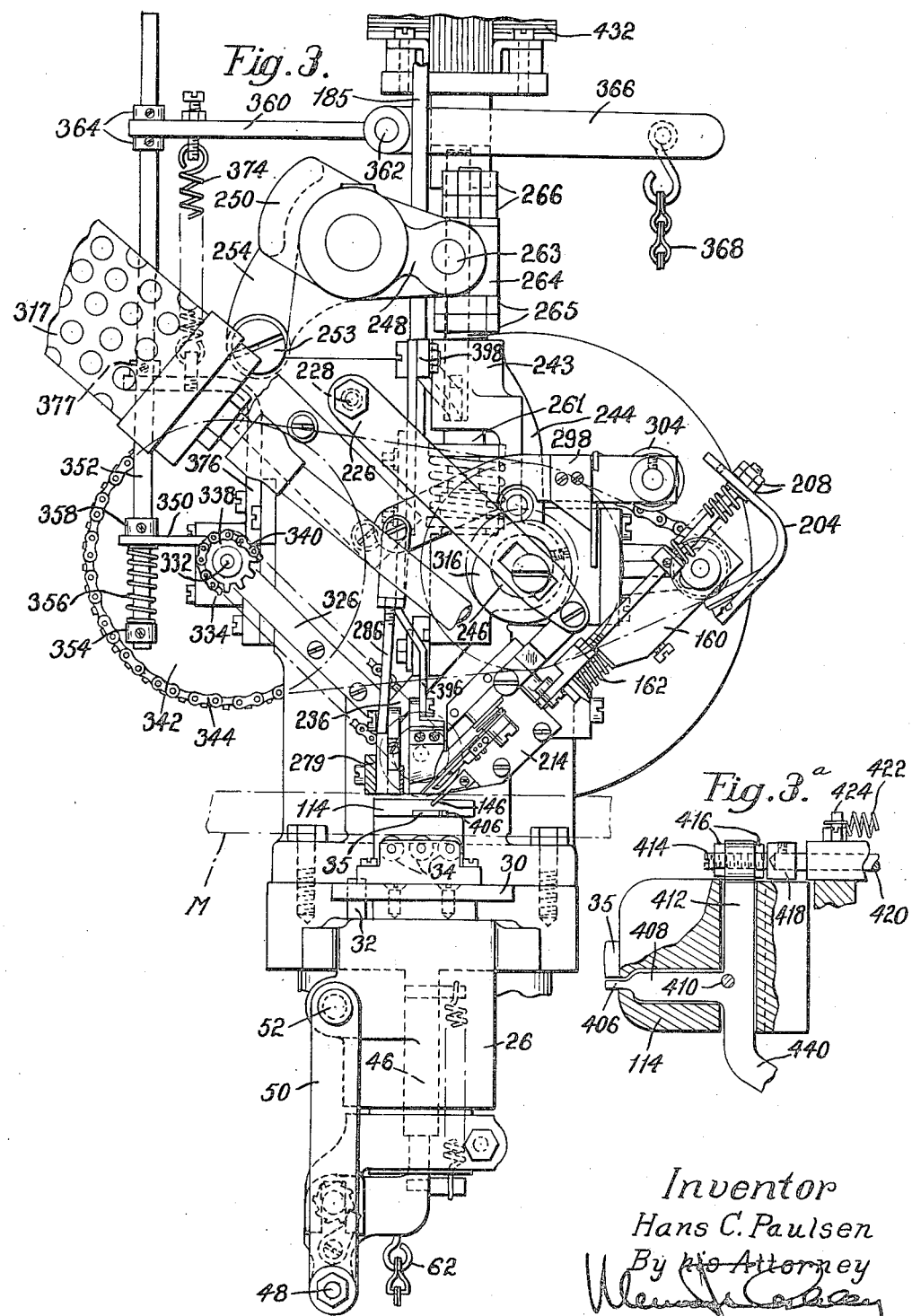

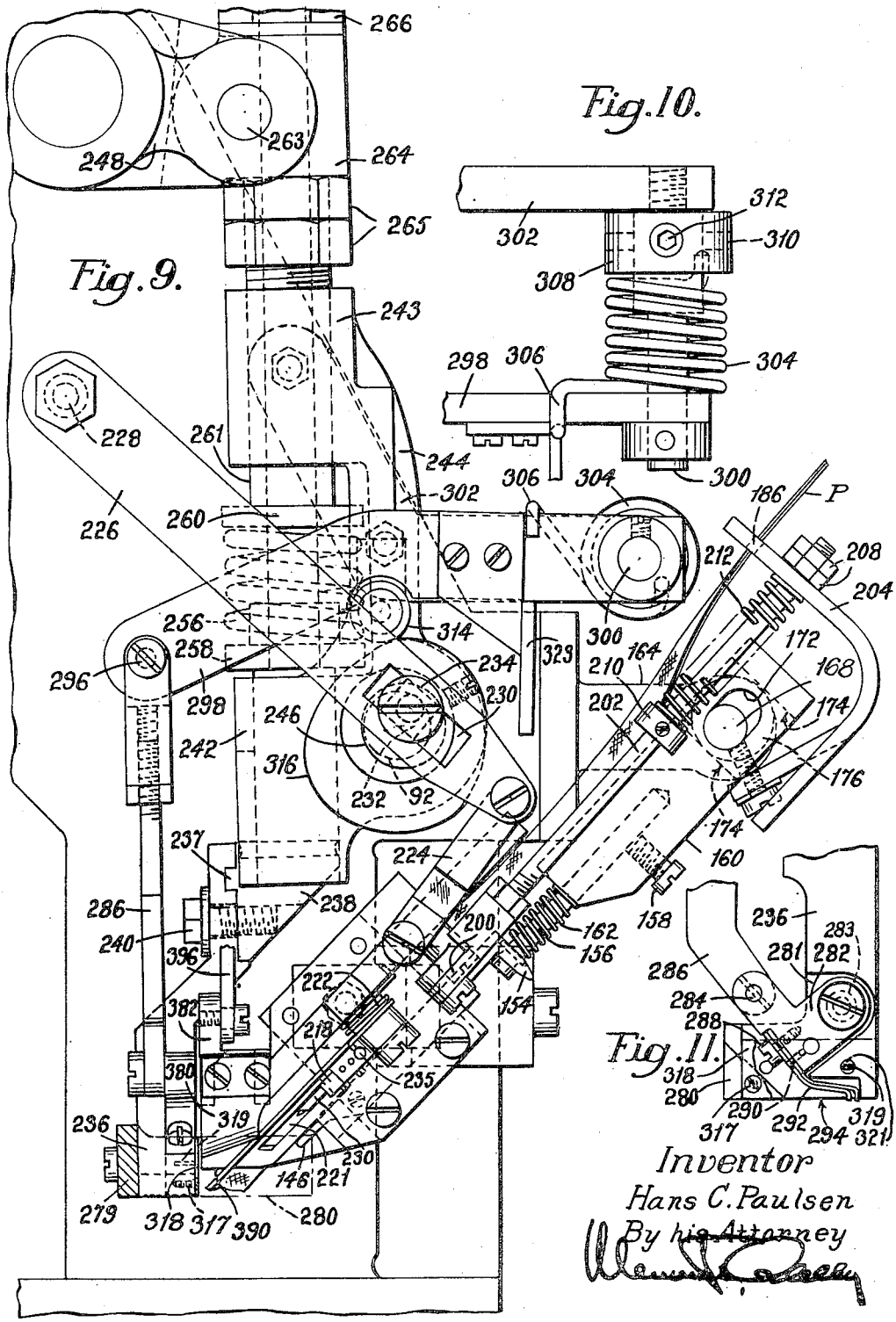

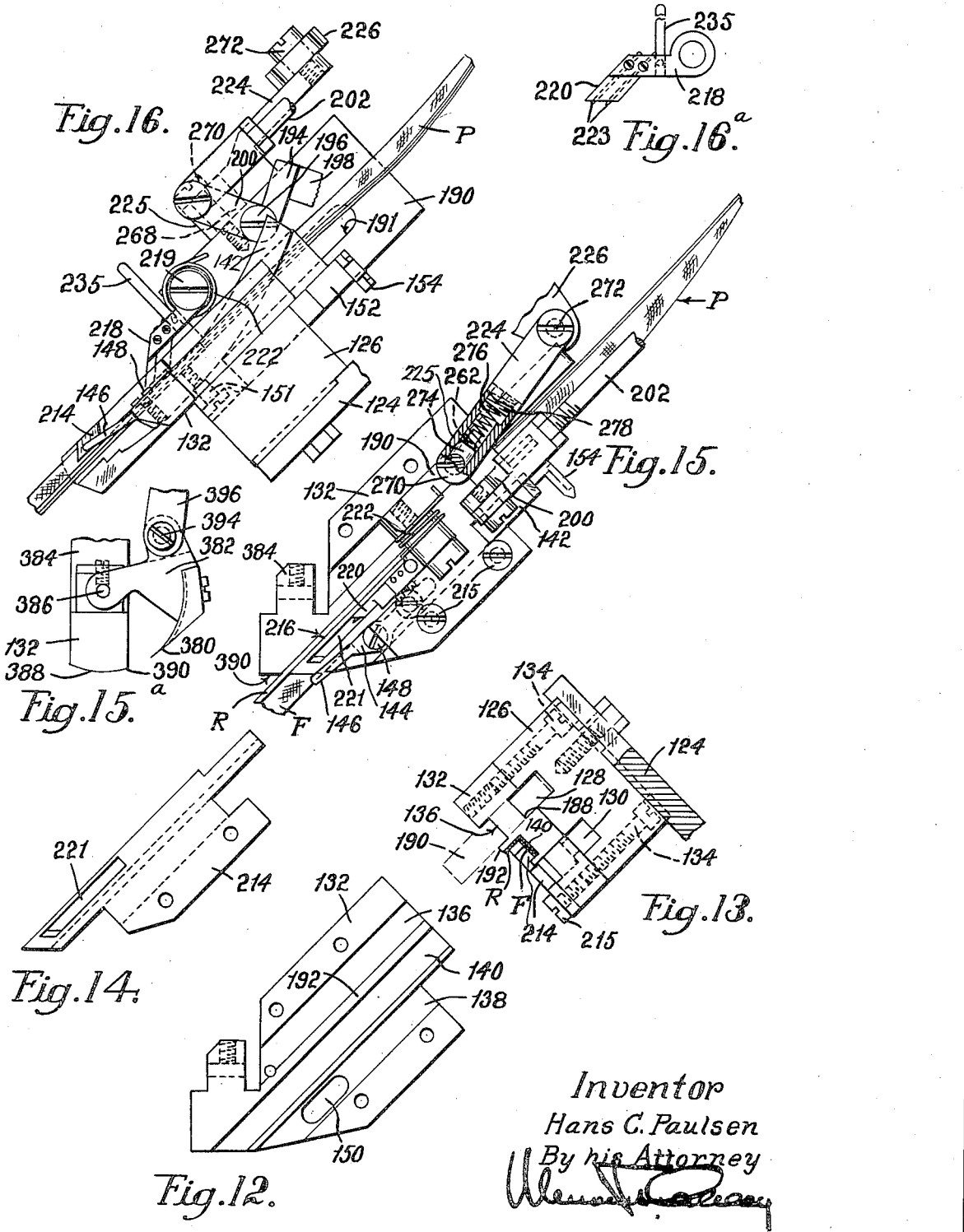

Jan. 17, 1950          H. C. PAULSEN          2,494,578
MACHINE FOR USE IN THE MANUFACTURE OF INSOLES
Filed March 5, 1948          7 Sheets-Sheet 7
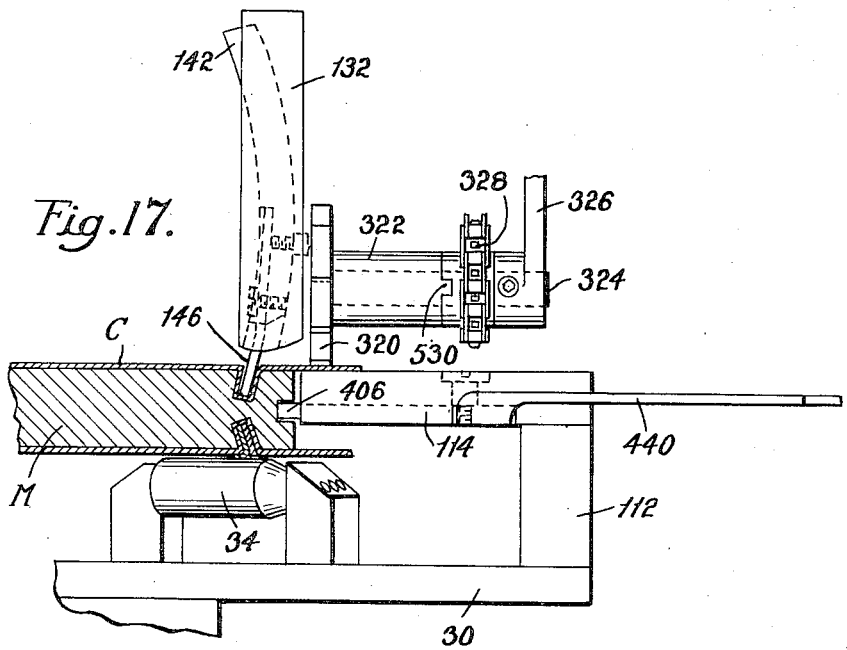
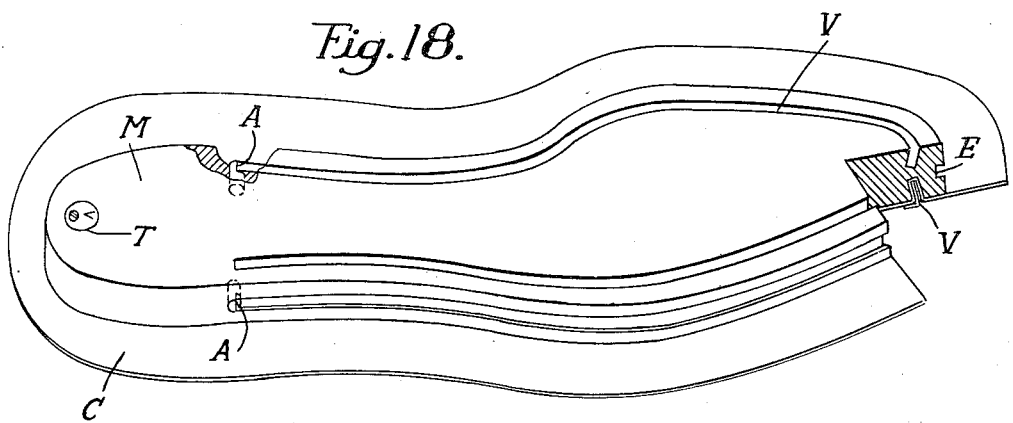
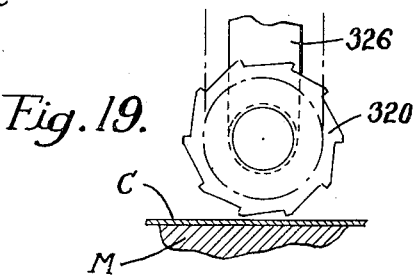
Inventor
Hans C. Paulsen
By his Attorney Patented Jan. 17, 1950

2,494,578

UNITED STATES PATENT OFFICE 2,494,578

MACHINE FOR USE IN THE MANUFACTURE OF INSOLES

Hans C. Paulsen, Medford, Mass., assignor to United Shoe Machinery Corporation, Flemington, N. J., a corporation of New Jersey Application March 5, 1948, Serial No. 13,197

44 Claims. (Cl. 12—20)

This invention relates to machines for use in the manufacture of insoles, particularly welt insoles.

Objects of the invention are to improve and perfect machines for this work such as the machine disclosed in my prior application Serial No. 725,415, filed January 31, 1947, which machine, like the machine of the present invention, is for use in practising the method of making insoles disclosed in an application for Letters Patent of the United States Serial No. 717,121, filed December 19, 1946, in the name of Stanley M. Griswold, such use being facilitated by the provision of insole matrices made as disclosed in an application for Letters Patent of the United States Serial No. 717,122, filed December 19, 1946, in the names of Stanley M. Griswold and myself.

The matrices to be employed in the use of the present invention are similar to those described in the application last referred to, each comprising an insole-shaped body having two flat, parallel faces with a rib-forming groove in each flat face and with a groove in its edge face the bottom of which is at a predetermined, uniform distance from the rib grooves. All the grooves preferably end at the breast line of the matrix. The matrices for use with the machine of the present invention, however, have their rib grooves inclined inwardly with respect to the matrices. For example, the inner wall of each groove may be at an angle of sixty-five degrees to the adjacent flat face of the matrix at the mouth of the groove, the opposite walls of the groove being parallel.

Like the machine of my above-mentioned prior application, the present machine has a rigidly supported work support which may be lowered by a treadle and is raised by a spring to its rigidly supported position; it has a tucking tool rapidly reciprocated to tuck a sheet of flexible material such as canvas into the groove of the matrix; it has a four-motion feed foot yieldingly operated heightwise to feed the work along, said foot acting also to force a core piece into the fold made by the tucking tool; it has means independent of the foot for feeding the core piece into position to be inserted by the feed foot; it has an auxiliary feed for the marginal portion of the canvas; it has on the work support means for urging the matrix toward the edge guide running in the edge groove of the matrix; it has means for directing a blast of hot air on the canvas in the region of the tucking operation; and it has means operated automatically by engagement therewith of the end of the edge groove for causing the core piece to be severed.

As a feature of the present invention, the tucking tool operates in a direction parallel to the inclined walls of the rib groove in the upper side of the matrix. To provide space for presenting the core piece over the mouth of the fold in the canvas made by the tucking tool, a slide carrying the tucking tool is inclined at about forty-five degrees to the general direction of extent of the rib groove as in my prior machine, and to accomplish its present purpose the slide is curved and guided in a circular arc the center of which is in space at the front of the machine, the radius of the arc being such as to cause the tucking tool to move in a direction substantially parallel to the inclined walls of the rib groove. The edge guide running in the edge groove of the matrix positions it so that the tucking tool will enter the groove centrally of its mouth.

The present machine is adapted to receive the core piece in a flat condition. This core piece, as illustrated, comprises a flat strip of canvas cemented on one side, to which side is cemented a second narrower strip of canvas stiffened with thermoplastic material. The second strip may be about half as wide as the first strip and may have one edge flush with the edge of the first strip.

This composite strip is drawn from a reel in a flat condition and in the machine the single-ply portion is bent at right angles to form a flange on the core piece.

As a further feature of the present invention, means is provided in the machine for bending the single-ply portion of the core piece at a right angle to the two-ply portion, said means comprising a guide having surfaces at a right angle to each other and a creaser operated to force the strip into said angle and cause the single ply of the composite core piece to be bent at right angles to the two-ply portion, thus forming a flange on the core piece.

For feeding the core piece, novel mechanism is provided which comprises a reciprocating slide carrying a spring-pressed pawl provided with sharp prongs to engage the core piece and means for reciprocating the slide in timed relation to the feed of the work to cause the core piece to be fed at a rate slightly greater than the work is fed, thus fulling the core piece and preventing tension thereon which may cause "strapping" and result in distortion of the insole when removed from the matrix.

In performing the tucking operation upon some parts of the matrix, for example at the toe, the feed movement of the matrix in the direction of the groove is less than at other parts of the matrix which may cause an excessive crowding of the core piece by the core-piece feed mechanism. Accordingly, the pawl of the core-piece feed mechanism is mounted to yield in response to resistance of the core piece to prevent excessive feed of the core piece at such portions of the matrix. In the illustrated machine, the above-mentioned creaser is operated from movement of the feed slide.

The operation of tucking the canvas into the groove is performed first on one side of the matrix and then on the other. Therefore, the work is thicker when the second side of the matrix is being operated on than it was when the first side was operated on. Accordingly, as a feature of the present invention, means is provided for alternately presenting the work support at different heights.

To present the matrix and work to the machine the work support is lowered against a spring by depressing a treadle, and means operated by reverse movement of the work support when the treadle is released is provided for presenting and holding the work support alternately at different heights. For example, when the first side of the matrix is being operated upon, the work support is held up by the corner between the sides of a four-sided prism, and, when the work support has been lowered to release the matrix and allowed to rise to support the matrix for operation on its second side, the prism is turned so that the support is held up by one of the flat sides of the prism. Thus, the support is held in a lowered position to compensate for the thickness added to the matrix by the canvas applied to its first side. Suitable means is provided for turning the prism one-eighth of a turn each time the work support rises.

It is important in the completed insole that the canvas and the core piece be drawn tight against the inner wall of the rib groove in the matrix, that is, that there be no looseness of the materials at the base of the rib on its inner side. Accordingly, as a further feature of the present invention, means is provided for smoothing inwardly of the matrix the single-ply flange of the core piece while the two-ply portion is being inserted into the fold of the canvas. As illustrated, a wiper mounted on the feed foot is operated in time relation to the feed foot to wipe inwardly of the matrix the flange of the core piece while the feed foot is down upon the work. The wiper smooths out wrinkles in the flange and canvas and insures that the canvas and core piece will be drawn closely against the angle between the inner wall of the groove and the adjacent flat face of the matrix. Thus, when the insole is completed by cementing a body portion to the canvas, there will be no space or air pocket between the canvas and the core piece at the base of the rib on its inner side and hence possible tearing of the canvas during the setting of the inseam stitches is avoided.

In the drawings,

Fig. 3 is a front elevation of the head of the machine including the work support;

Fig. 3ª is a plan view, partly in section, of parts shown in Fig. 3;

Fig. 4 is an elevation of the front portion of the head of the machine and work support taken from the left-hand side;

Fig. 5 is a front elevation, partly in section, of the work support;

Fig. 6 is a view, partly in section, of parts shown in Fig. 4;

Fig. 7 is a front view of parts shown in Fig. 6;

Fig. 8 is a view from below of parts shown in Fig. 6;

Fig. 9 is an enlarged front elevation of the operating instrumentalities of the machine head;

Fig. 10 is a plan view of parts shown in Fig. 9;

Fig. 11 is a view of the feed foot from the right-hand side showing the wiper;

Fig. 12 is a front view of a plate on which various operating instrumentalities are mounted;

Fig. 13 is a view, partly in section, looking at the right-hand end of Fig. 12 and showing the block and bracket on which the plate is mounted;

Fig. 14 is a front view of a cover plate for the plate of Fig. 12;

Fig. 15 is a front elevation, partly in section, of the core-piece forming and feeding mechanism associated with the plate shown in Fig. 12;

Fig. 15ª is a detail of the core-piece cutting mechanism associated with parts shown in Fig. 15;

Fig. 16 is a view of parts shown in Fig. 15 taken at a right angle to that figure;

Fig. 16ª is a detail of the feed pawl shown in Fig. 16;

Fig. 17 is a detail taken from the right-hand side of the machine showing the tucking tool and auxiliary feed mechanism;

Fig. 18 is a perspective view, partly in section, of the matrix after the canvas and core piece have been applied to one side thereof; and Fig. 19 is a detail, as seen from the front, of parts shown in Fig. 17.

For use with this machine, a matrix (Fig. 18) is provided which comprises an insole-shaped body M the opposite faces of which are flat and parallel. Each face has a groove V therein located with respect to the edge of the matrix so that it represents the shape and location of the rib desired on an insole, the depth of the grooves corresponding to the height of the desired rib and their width to its thickness. It is desired that the rib of the resulting insole be inclined inwardly with respect to the insole. Hence the walls of the groove V in the matrix are inclined inwardly with respect to the matrix; for example, as illustrated, the walls of the groove are parallel and the inner wall is at an angle of 65 degrees to the adjacent flat face of the matrix. In other words, the center line of the groove makes an angle of 25 degrees with a line perpendicular to a flat face of the matrix and intersecting the center line at the mouth of the groove. In the edge face of the matrix is a groove E which is at a uniform predetermined distance from the grooves V, the bottom of the groove E being utilized in guiding the matrix during the operation of the machine thereon and the ends A of the groove serving as abutments to determine the beginning and the end of the operation of the machine.

Figure 2:
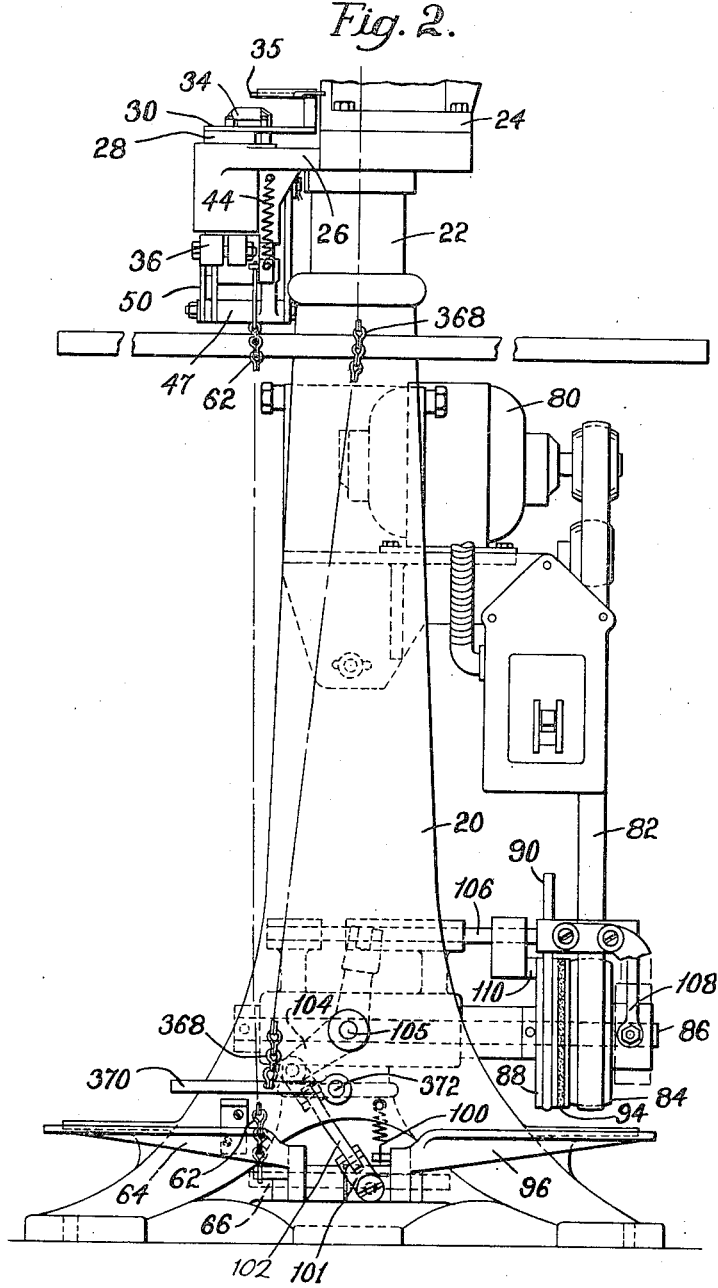
Fig. 2 is an elevation of the base, column and work support of the machine taken from the right-hand side.

The machine comprises a column 20 (Fig. 2) in the upper end of which a neck 22 of a head frame 24 slides vertically for adjustment to suit the operator. On the head 24 is a bracket 26 in which a stem 28 of a work-supporting table 30 slides vertically, being held from rotation by a pin 32 (Fig. 4). Rolls 34 are mounted on the table with their axes inclined to the direction of feed of the work and act to crowd the matrix in against an edge guide 35 located in the groove E of the matrix and carried by the table 30. The stem 28 has secured to its lower end a member 36 (Figs. 4 and 5) to which links 38, 40 are pivoted by a pin 42. The link 38 has an upward projection 41 which is held by a spring 44 against a surface 46 on the bracket 26 to limit its counter-clockwise movement and is also provided with a sleeve portion 47 through which extends a bolt 48 by which the lower ends of long links 50 are pivoted to the links 38, 40. The upper ends of the links 50 are pivoted by a pin 52 to the bracket 26. Spacers 51, 53 on the bolt 48 permit the nut on the bolt to be set up without cramping the various links pivoted thereon. The links 38, 40 and 50, 50 thus constitute an inverted double toggle which, when straight, supports the work table rigidly. By rotating the link 38 clockwise against the spring 44, the table 30 may be lowered for insertion of the work.

To support the table rigidly alternately at different heights to compensate for the extra thickness of the work when the second side of the matrix is operated upon, the following mechanism is provided. The member 36 is provided with a vertical slot 56 the end portions of which fit the pin 42 and the central portion of which is larger than the pin 42 to accommodate a prismatic member 58 which is fixed to the pin 42. The member 58 is herein shown as a square prism, and in the top 59 of the slot 56 is a groove or recess 60 (Fig. 7) in which the corner of the prism may rest when the support is in its higher position, as when the first side of the matrix is being operated upon. By turning the prism so that one of its flat sides engages the top 59 of the slot 56, the table is rigidly supported in a lower position, as when the second side of the matrix is being operated upon, the difference in height of the work support corresponding substantially to the thickness of the canvas already applied to the matrix.

The link 38 is connected by a chain 62 to a treadle 64 (Fig. 2) pivoted at 66 in the base of the machine. Depression of the treadle turns the link 38 clockwise, swinging the links 38, 40, 50, 50 to the positions shown in dotted lines in Fig. 5 and lowering the table 30 for insertion of the work. Upon release of the treadle the spring 44 returns the table to work-supporting position. The pin 42 has on one end an eight-toothed ratchet wheel 68, and on the link 40 is pivoted at 70 a pawl 72 held by a spring 74 against the ratchet wheel 68, the swinging of the link 40 when the table is lowered causing the pawl to move from one tooth of the ratchet wheel to the next and, during the upward movement of the table, the pawl turns the ratchet wheel one-eighth of a revolution, thus alternately presenting a corner and a flat side of the prism 58 to the top 59 of the slot 56 and hence alternately supporting the table 30 at different heights.

Figure 1:
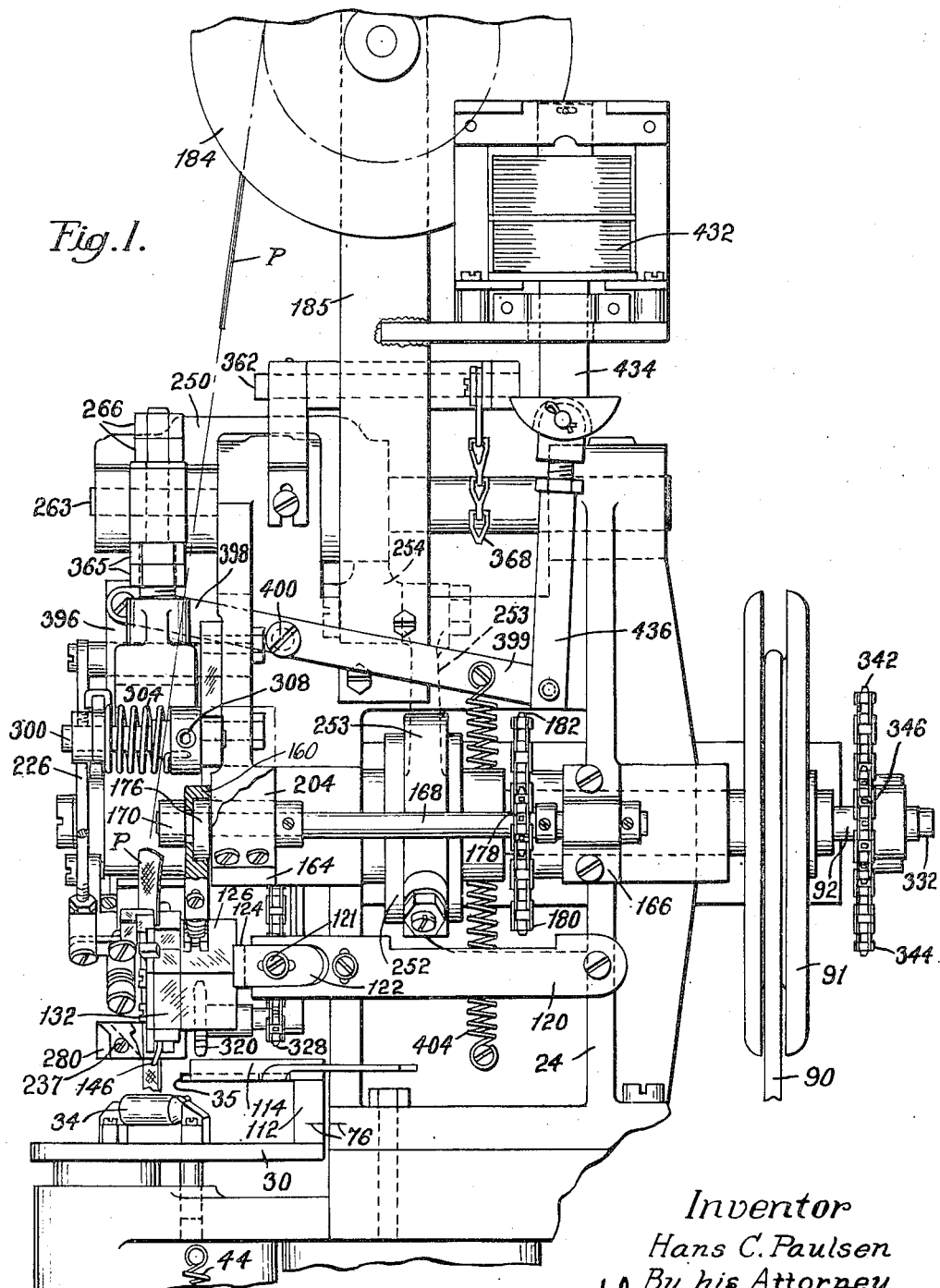
Fig. 1 is an elevation of the head of the machine taken from the right-hand side.

To ascertain whether the prism 58 is in the proper position for the operation in hand, the operator may observe index marks 76 (Fig. 1), one on the frame and one on the table. If the marks coincide, the table is in its higher position for operation on the first side of the matrix, and if the table mark is below the other mark the table is in its lower position and the treadle should be operated once more to bring the table to its higher position for operating on the first side of the matrix.

The machine is driven by an electric motor 80 (Fig. 2) mounted on the column 20 and connected by a belt 82 to a pulley 84 loose on a countershaft 86 which is held from endwise movement. A grooved pulley 88 is fixed to the shaft 86 and connected by a belt 90 to a pulley 91 (Fig. 1) on a main shaft 92 journaled in the head 24 of the machine. Between the pulleys 84 and 88 is a friction disk 94. A treadle 96 pivoted at 66 and raised by a spring 100 is connected by a universal joint 101 to a link 102 which is pivoted to a lever 104 having a fixed fulcrum at 105, the lever being connected to a sliding rod 106 having a yoke 108 to engage the pulley 84 and a brake 110 to engage the pulley 88. Depression of the treadle moves the yoke to the left to cause the pulley 88 to be driven and release of the treadle allows the spring 100 to apply the brake 110 to the pulley 88 to stop the machine.

The table 30 carries an upright 112 (Figs. 1 and 4) on which is a horizontal plate 114 the outer end of which is shaped to form the combined stop and edge guide 35 which runs in the edge groove E of the matrix. The matrix has a tang T (Fig. 18) near its heel end upon which a piece of canvas C larger than the matrix is impaled. The operator draws the canvas straight and holds it in proper position to cover the matrix while he depresses the treadle 64 to lower the table 30. Having placed the matrix upon the rolls 34 on the table 30 with the bottom of the edge groove E against the guide 35, he moves the matrix toeward until the end A of the groove E at the breast line engages the guide 35 and he then releases the treadle. As the spring 44 acts to return the links 40 and 50 to their vertical position to raise the work support, the spring-pressed pawl 72 on the link 40 engages a tooth of the eight-toothed ratchet wheel 68 and turns the prism 58 so that one of its corners engages the depression 60 in the top 59 of the slot 56. After the operation of tucking the canvas C into the groove V on one side is completed, the treadle 64 is depressed to release the matrix which is then turned the other side up and again presented to the machine with another piece of canvas, as above described. When the treadle is released, the prism 58 will be turned so that one of its flat sides engages the top 59 of the slot 56, and the table 30 will be again rigidly supported but in a lower position to compensate for the thickness of the canvas C applied to the first side of the matrix.

On the right-hand side of the machine headframe is secured a bar 120 (Fig. 1) the front end of which has a recess in which is inset and adjustably held by a screw 121 an arm 122 of a right-angular bracket the other arm 124 of which is secured in a recess in a square block 126. The front face of the block (Fig. 13) has two grooves 128, 130 inclined at 45 degrees to the horizontal. To the front face of the block 126 a plate 132 is secured by four screws 134 entering from the back side of the block. In the front face of the plate 132 are two grooves 136, 138, the groove 136 being opposite and parallel to the groove 128, and the groove 138 being opposite and parallel to the groove 130. In the plate 132 between these grooves is a groove 140 through which the core piece P (Fig. 1) runs. The groove 138 is formed in a circular arc the center of which is in space about four inches in front of the machine. Mounted in this groove is a curved slide 142 (Figs. 16 and 17) the lower end of which is recessed to receive the shank 144 of a tucking tool 146 which is held thereon by a screw 148. In the bottom of the groove 138 is a slot 150 (Fig. 12) through which extends a screw stud 151 (Fig. 16) by which the slide 142 is loosely secured to an operating member 152 which lies in the slot 130 of the block 126. The outer end 154 of the operating member 152 (Fig. 9) extends at right angles to the main portion and is forked to receive a headed pin 156 which is secured by a setscrew 158 in a bore in a pitman 160. On the pin 156 is a compression spring 162 with one end abutting the pitman 160 and the other end lying in a recess in the outer face of the end 154 of the operating member 152.

In bearings 164, 166 on the head frame 24 (Fig. 1) is mounted a shaft 168 which passes through a slot 172 extending longitudinally of the pitman 160. On the rear face of the pitman (Fig. 9) is a recess with straight, parallel sides 174 between which is an eccentric 176 fast on the shaft 168. The pitman 160 is held on the shaft 168 by a collar 170 secured thereto. The shaft 168 (Fig. 1) carries a small sprocket wheel 178 which is connected by a sprocket chain 180 to a large sprocket wheel 182 on the main shaft 92. As illustrated, the ratio of the larger sprocket 182 to the smaller one 178 is such as to turn the shaft 168 four times as fast as the main shaft 92. The operating member 152 is thus rapidly reciprocated yieldingly in a direction inclined at 45 degrees to the horizontal while the curved slide 142 connected thereto moves in a curved path in a plane inclined at 45 degrees to the horizontal. The resulting movement of the tucking tool 146 while in the groove V is substantially in a plane parallel to the two walls of the inclined groove. As the matrix is fed, by means to be described, the tucking tool 146 progressively forces the canvas C into the inclined groove V and immediately thereafter a portion of the core piece P is inserted in the fold of canvas made by the tucking tool.

The core piece (Fig. 13) consists of a thick portion F to be inserted in the fold and a thin portion R which is bent at right angles to the portion F and serves as a reinforcement for the insole at the base of the inner side of the rib. The core piece may consist of a wider strip of canvas or other suitable material to which is cemented a narrower strip with one of its edges flush with the edge of the wider strip. The narrow strip is preferably impregnated with thermoplastic stiffening material and the composite core piece is coated with pressure-responsive cement. The core piece P is wound in flat condition on a reel 184 (Fig. 1) on a support 185 and is led from the reel through a guide opening 186 (Fig. 9) to a core-piece-flanging mechanism to be described.

In the slot 136 of the plate 132 (Figs. 12 and 13) and in a corresponding slot 188 in the back of the plate and coinciding with the slot 128 is mounted a slotted member 190 constituting a slide, the member 190 having a long slot 191 (Fig. 16) open at one end which embraces the solid part of the plate 132 between the slot 136 and the slot 188. Between the slots 136 and 140 is a wall 192 (Fig. 13) at right angles to the bottom of the slot 140 against which the thicker portion of the core piece P lies. The thinner portion of the core piece is bent at right angles to the thicker portion by being forced into the angle between the wall 192 and the bottom of the slot 140. For this purpose an angular member or creaser 194 (Fig. 16) is pivoted at 196 on the slide 190. An arm of the creaser is formed as a foot 198 with teeth on its lower edge and an arm 200 of the creaser (Fig. 9) is connected by a rod 202 to a fixed part of the machine which, as illustrated, is a shield 204 which has the opening 186 through which the core piece P passes. The shield intercepts oil thrown from the eccentric 176 due to its rapid rotation. The rod 202 passes through the shield 204 and has set nuts 208 on its end portion. Between a collar 210 on the rod and the shield 204 is a compression spring 212 which raises the creaser foot when the slide moves toward the right. Movement of the slide 190 to the left (Fig. 16) causes the foot 198 to press the core piece into the angle between the wall 192 and the bottom of the slot 140.

To the plate 132 is secured a cover plate 214 by two screws 215. The plate covers the curved slide 142 and is formed to provide part of the curved guideway for the slide. The plate 214 extends partly over the groove 140 but stops short of the wall 192, thus providing a slot 216 (Fig. 15) through which the thinner portion or flange R of the core piece may extend after it is bent at right angles to the thicker portion by the creaser foot 198.

To feed the formed core piece P through the groove 140, a pawl 218 (Fig. 16) is pivoted at 219 to the slide 190 and has an end portion 220 reduced laterally to extend through a slot 221 in the cover plate 214 and engage the thick portion F of the core piece toward which it is urged by a torsion spring 222. In the core-engaging face of the pawl are two needles 223 (Fig. 16a) inclined at a substantial angle, for example 45 degrees, to the direction of movement of the pawl, the needles engaging the core piece as they are moved downwardly and to the left by reciprocation of the slide 190 and releasing the core piece as they are moved in the opposite direction. The slide 190 is connected by a link 224 to a lever 226 (Fig. 9) fulcrumed at 228 on the head-frame 24 and having between its ends a slot 230 in which is a block 232 secured by a screw stud 234 eccentrically of the main shaft 92. Feed movements are thus imparted to the pawl 218 and to the creaser foot 198. The nuts 208 are so set that at the limit of the feed movement of the pawl the creaser foot 198 is pressing the core piece firmly into the angle between the wall 192 and the bottom of the groove 140. The creaser foot 198 travels with the slide 190 and its action of pressing the core piece into the angle occurs substantially at the end of the feed movement of the slide 190 and hence does not interfere with the feeding of the core piece by the pawl. To release the pawl when inserting or removing the core piece, it is provided with a handle 235.

To advance the work for the progressive action of the tucking tool 146, a four-motion feed foot 236 (Fig. 9) is provided which engages the canvas on the matrix on both sides of the groove as well as the core piece and its flange R, the foot moving leftwise to feed the work. The foot 236 has a horizontal groove at its upper end engaging a rib 237 on a member 238 and is held by a screw 240 which passes through a horizontal slot in the foot and is threaded into the member 238. This member extends up through two arms 242, 243 of a yoke 244 which is moved to and fro in the direction of feed by an eccentric portion 246 on the main shaft 92. Up-and-down movements are imparted to the member 238 by an arm 248 on a rocker 250 (Fig. 3) which is oscillated by an eccentric 252 (Fig. 1) on the main shaft 92, the eccentric being connected by an eccentric strap 253 to an arm 254 on the rocker 250. Downward movement of the feed foot is rendered yielding by a compression spring 256 (Fig. 9) on the member 238 which rests on a washer 258 engaging a shoulder on the member 238. The upper end of the spring engages a washer 260 upon which a sleeve 261 rests, the sleeve extending through the arm 243 on the yoke 244. The arm 248 is pivoted at 263 to a block 264 through which the member 238 passes and which rests on nuts 265 threaded on the sleeve 261. Above the block 264 nuts 266 are threaded on the member 238. Thus, positive upward movement is imparted to the feed foot 236 and yielding downward movement through the spring 256, the to-and-fro movements being imparted by the eccentric 243 on the shaft 92.

The eccentricity of the shaft 92 where the yoke 244 is mounted thereon and the eccentricity of the screw stud 234 are so related that the feed of the core piece by the pawl 218 occurs during the feed of the matrix by the feed foot 236. Preferably the amount the core piece is fed is somewhat in excess of the amount the matrix is fed, thus insuring that the thick portion of the core piece will be tucked tightly into the fold of the canvas. At certain portions of the work, for example when rounding the toe end of the matrix, the movement of the work in the direction of the groove is lessened and hence if the feed pawl 218 were operated positively the core piece would receive too much longitudinal compression. Accordingly, the feed movement of the pawl 218 is made yieldingly. The link 224 (Figs. 15 and 16) has a larger portion 225 which is slotted at 268 to receive a screw stud 270 connecting it to the slide 190 and has an offset portion pivoted at 272 to the lever 226. The larger portion 225 has a longitudinal bore extending into the slot 268, and slidingly mounted in the bore is a cylindrical member 274 backed up by a compression spring 276 retained in the bore by a screw plug 278. The member 274 has a cylindrical concavity in the end engaging the screw stud 270. With this construction, if for any reason the pawl 218 is feeding the core piece too fast for the feed movement of the feed foot, the spring 276 will yield and excessive crowding of the core piece will be avoided.

The feed foot 236 has supplementary feed portions, one portion 279 (Fig. 9) being secured to the feed foot 236 and another portion 280 extending to the right past the tucking tool 146. While the feed foot 236 by itself is adequate for making insoles for shoes with broad toes, it is found that in rounding the toe end of a matrix for pointed toes the foot 236 would sometimes extend beyond the matrix and could not properly feed the work. The extension 280 enables the feed foot to maintain feeding contact with the work at all times whether the toe of the matrix is pointed or not. The work-engaging faces of the foot 236 and the supplementary portions 279, 280 are preferably provided with corrugations extending transversely of the direction of feed.

It is important that, in the completed insole, there be no looseness of the rib materials at the base of the rib on its inner side and that the materials be closely drawn against the inner wall of the groove V and shaped against the angle between the flat face of the matrix and the inner wall of the groove. For this purpose a wiper is provided which acts when the feed foot is down and during its feed movement to wipe an adjacent portion of the flange R of the core piece inwardly of the matrix, thus not only smoothing out any wrinkles that may be formed in the flange but also drawing the material of the rib, that is, the inner portion of the fold of the canvas C and the thicker part of the core piece, against the inner wall of the groove V.

On the right-hand face of the feed foot 236 (Fig. 11) is a recess 281 in which is pivoted at 283 a member 282 which is pivoted at 284 to an operating rod 286. The member 282 has an inclined face to which is secured by a screw 288 and a dowel pin 290 a resilient wiper 292. The wiper may consist of two leaf springs having downturned ends arranged to extend slightly below the work-engaging face 294 of the feed foot 236. A pull on the operating rod 286 causes the wiper 292 to swing about the pivot 283 and wipe inwardly of the matrix the thinner portion R of the core piece while the adjacent face 294 of the feed foot is pressing the flange R and canvas C down upon the matrix.

The operating rod 286 (Fig. 9) is pivoted at 296 to a lever 298 fulcrumed on a stud 300 fixed in a bracket 302 secured to the head-frame 24. On the stud 300 (Fig. 10) is a torsion spring 304 one end of which has a hook 306 engaging the lever 298 and the other end of which enters a hole in a capstan collar 308. The collar has holes 310 in its periphery to receive a tool by which the desired tension may be applied to the spring 304, the collar being then held by a setscrew 312. Between its ends the lever 298 carries a roll 314 which is held against a cam 316 on the main shaft by the spring 304. While the feed foot 236 is pressing the core piece into the fold of the canvas and feeding it along, the cam 316 lifts the lever 298, causing the wiper 292 to wipe the flange R of the core piece inwardly of the matrix, thus insuring that the rib materials will be drawn tightly against the inner wall of the groove V. Secured by a screw 317 to the right-hand side of the foot 236 (Fig 9) is a plate 318 the rear end of which has a struck-out lug 319 loosely engaging a hole 321 (Fig. 11) in the foot 236. The rear end of the plate can move heightwise enough so that the flange of the core piece will not be pressed down before it is acted upon by the wiper 292 and its movement is limited so the flange of the core piece cannot rise high enough to be caught by the wiper 292 in its return movement.

Mounted on the wiper lever 298 is a shield 323 to catch oil thrown from the adjacent cam and eccentric on the main shaft 92.

In order that the fold of canvas tucked into the groove may form a firm and suitable sewing rib as well as provide greater body and strength in the completed insole, the canvas C when applied to the matrix has been treated with a stiffening material such as natural or synthetic resin on the exposed side and is also coated on that side with suitable pressure-responsive cement. Since it is difficult to tuck the thus-stiffened canvas into the groove, it is desirable to render the canvas temporarily limp in the region where the tucking operation is occurring. When the stiffening material is resin or other thermoplastic material, heat for rendering the canvas limp is provided by a hot air blast apparatus 317 (Fig. 3) supported on the head of the machine with its hot air nozzle 318 (Fig. 4) directed to that portion of the canvas where the tucking operation is being performed. The apparatus may be of a usual commercial type such, for example, as that disclosed in United States Letters Patent No. 1,777,744, granted October 7, 1930, and No. 1,869,737, granted August 2 1932, in the name of A. A. Breuer.

In tucking the canvas into sharply curved portions of the groove V, as in rounding the toe, it is desirable to provide auxiliary feeding means for the canvas to avoid wrinkles therein. The canvas C extends more or less beyond the periphery of the matrix, as shown in Fig. 17, where it rests on the plate 114 carried by the work-supporting table 30. Above the plate is a toothed wheel 320 (Figs. 1, 17 and 19) having, for example, ten teeth. The wheel carries a sleeve 322 which is rotatable on a shaft 324 fixed to a lever 326, and a sprocket wheel 328 has its hub portion interlocked at 530 with the sleeve 322. The lever 326 (Fig. 3) is pivoted on a shaft 332 mounted in bearings 334 secured to the left side of the head, and the shaft 332 carries a sprocket 338 corresponding in size to the sprocket 328 to which it is connected by a sprocket chain 340. On the rear end of the shaft 332 (Fig. 1) is a large sprocket wheel 342 connected by a chain 344 to a smaller sprocket wheel 346 on the main shaft 92, the ratio being 2½ to 1. With this ratio and with ten teeth in the feed wheel 320, the movement of the parts may be so timed that the engagement of a tooth on the wheel 320 to feed the canvas will occur during the withdrawal of the tool 146 and the space between the teeth will be over the canvas (Fig. 19) during the advance of the tool to tuck the canvas into the groove. Thus the feed wheel will not interfere with the movement of the marginal portion of the canvas toward the groove during the tucking action of the tool, and the engagement of a tooth of the feed wheel with the marginal portion of the canvas will occur while the tool is withdrawn and will advance the canvas, thus preventing the formation of wrinkles therein.

In order that the auxiliary feed wheel 320 may be employed or not at the will of the operator, an arm 350 fixed to the arm 326 extends to the left (Fig. 3) and is bored to permit passage of a rod 352 therethrough. Between the arm 350 and a collar 354 on the rod is a compression spring 356 which may be held under initial compression by a collar 358 fixed on the rod above the arm 350. The rod passes loosely through an arm 360 of a lever fulcrumed between its ends to the reel support 185 by a pin 362. The rod is connected to the arm 360 by a pair of collars 364, one above and one below the arm. The other arm 366 of the lever is connected by a chain 368 to a treadle lever 370 (Fig. 2) pivoted at 372 to the base of the machine. A tension spring 374 (Fig. 3), which is connected at its upper end to the lever arm 360 and at its lower end to a bracket 376 on the frame 24, is provided to turn the lever 360, 366 counterclockwise to lift the feed wheel 320 from engagement with the work, its upward movement being limited by a collar 377 on the rod and engaging the bracket 376. When the operator desires the assistance of the auxiliary feed wheel, for example when rounding the toe, he depresses the treadle 370, overcomes the spring 374 and causes the feed wheel 320 to be pressed against the canvas with a force determined by the compression of the spring 356.

When the canvas has been tucked and the core piece inserted throughout the extent of the groove V, the abutment A at the opposite end of the edge groove E in the matrix M will engage the stop or guide 35 or a trigger adjacent thereto to be described, thus arresting further feed movement of the work and indicating to the operator that the machine should be stopped by releasing the treadle 96.

The core piece now has to be severed and for that purpose a knife 380 (Fig. 15ª) is provided. The knife is cylindrically curved and is mounted on a carrier 382. The carrier is bifurcated to embrace a portion 384 of the plate 132 (Fig. 15) to which it is pivoted by a pin 386 at the center of curvature of the knife 380. In its movement about the pin 386 the knife passes over a similarly curved surface 388 on the plate 132. The side of the knife next to the tucking tool is cut away to clear the tool (Fig. 9) and its edge is inclined relatively to an adjacent edge 390 of the plate 132 to produce a shear cut as it passes by the corner of the plate, thus severing in a plane substantially parallel to the upper surface of the matrix the portion of the core piece which has been inserted in the groove from the portion passing downwardly through the groove 140.

Connected at 394 to the knife carrier 382 is a link 396 the upper end of which (Figs. 1 and 3) is connected to a lever 398 fulcrumed at 400 on the head-frame 24. A tension spring 404, which is connected at its upper end to a rear arm 399 of the lever 398 and at its lower end to the frame, holds the knife 380 in retracted position.

Means is provided for operating the knife automatically when the end of the operation is reached. For this purpose the guide or stop 35 is made in two parts (Fig. 3ª), one part being fixed for locating the matrix by engagement with the abutment A of the groove E at the beginning of the operation, and the other part 406 being movable slightly when engaged by the abutment A at the other end of the groove E at the conclusion of the operation. The part 406 may therefore appropriately be called a trigger. The trigger 406 is on the end of an arm 408 of an angle lever pivoted at 410 on the under side of the plate 114 which supports a marginal portion of the canvas. Another arm 412 of the angle lever has threaded through it a screw 414 which is held in adjusted position by set nuts 416. The screw is arranged to engage, in any heightwise position of the plate 114, a block 418 secured to the end of a sliding rod 420 held retracted by a tension spring 422 connected at one end to a fixed pin 424 (Fig. 4) and at the other end to a collar 426 on the rod 420. The block 418 is guided for horizontal movement and the rod 420 held from rotation by a fixed screw stud 428 which engages a vertical slot in the lower end of the block 418. When, at the completion of the tucking operation, the abutment A at the end of the groove E engages the trigger 406, the rod 420 will be moved to the left sufficiently to close a microswitch 430 mounted in circuit with a solenoid 432 (Fig. 1) the armature 434 of which is connected by a link 436 to the end of the rear arm 399 of the lever 398 which is connected to the upper end of the link 396 the lower end of which is pivoted to the knife carrier 382. The solenoid 432 is connected through the microswitch to a suitable source of current.

When, at the conclusion of the tucking operation, the abutment A at the end of the slot E in the edge face of the matrix M engages the trigger 406, the microswitch will be closed, whereupon the solenoid 432 will be energized, the armature 434 jerked up and the lever 398, 399 operated to push down the link 396 to cause the knife to sever the core piece.

The trigger may be operated at any time to cause the core piece to be severed by means of a handle 440 (Fig. 3ª) formed as part of the angle lever 408, 412 and located so as to be conveniently engaged by the operator's hand.

It should be understood that the term "canvas" as used in this specification is purely illustrative of the material which may be operated upon by the machine and that any other suitable sheet material may be used in place of it.

Having thus described my invention, what I claim as new and desire to secure by Letters Patent of the United States is:

1. A machine for working canvas into a matrix groove having inwardly inclined walls comprising a support for the matrix, means acting parallel to said inclined walls for working a portion of the canvas into the groove, and means for effective relative movement between the working means and the matrix whereby the working means acts progressively to work the canvas into the groove throughout its extent.

2. A machine for working canvas into a matrix groove having inwardly inclined walls comprising a support for the matrix permitting movement thereof in a predetermined plane, means acting parallel to the inclined walls of the groove for working a portion of the canvas into the groove, and means for effecting movement of the matrix in said plane whereby the working means acts progressively to work the canvas into the groove throughout its extent.

3. A machine for working sheet material into a groove in a matrix, said groove being inclined inwardly with respect to the matrix, comprising a matrix support, a reciprocating tool operating in a direction parallel to the inclined walls of the groove to tuck the material into the groove of the matrix, and means for moving the matrix relatively to the path of the tool to cause the tucking operation to be performed progressively.

4. In a machine for working sheet material treated with a thermoplastic substance into a groove in a matrix, said groove being inclined inwardly with respect to the matrix, comprising a matrix support, means for blowing hot air on the sheet material to render it limp, a reciprocating tool operating in a direction parallel to the inclined walls of the groove to tuck the material into the groove of the matrix, and a four-motion feed foot for moving the matrix relatively to the path of the tool to cause the tucking operation to be performed progressively.

5. A machine for working sheet material into a groove in an insole-shaped matrix, said matrix having a rib groove in its marginal portion the walls of which are inclined inwardly with respect to the matrix, comprising a matrix support, a reciprocating tool acting in a direction substantially parallel to the walls of the groove, work-feeding means acting on the work adjacent to the tucking tool, and means for moving the feeding means to feed the work whereby the tucking operation is effected progressively.

6. A machine for working sheet material into a groove in an insole-shaped matrix, said matrix having a rib groove in its marginal portion the walls of which are inclined inwardly with respect to the matrix, comprising a matrix support, a reciprocating tool acting in a direction substantially parallel to the walls of the groove, and work-feeding means engaging the work adjacent to the tool and at one side of the tool to feed the work and matrix whereby the tucking operation is performed progressively and the portion of the feeding means at the side of the tucking tool enables sharp toes to be rounded, said side portion at least maintaining feeding contact with the matrix while rounding a sharp toe.

7. A machine for working sheet material into a groove in an insole-shaped matrix, said matrix having a rib groove in its marginal portion the walls of which are inclined inwardly with respect to the matrix, comprising a matrix support, a reciprocating tool acting in a direction substantially parallel to the walls of the groove, work-feeding means acting on the work in advance of the tucking tool and at a side thereof, and means for moving the feeding means to feed the work whereby the tucking operation is effected progressively.

8. A machine for working sheet material into a groove in a matrix, said groove being inclined inwardly with respect to the matrix, comprising a matrix support, a reciprocating tool operating in a direction parallel to the inclined walls of the groove to tuck the material into the groove of the matrix, means for moving the matrix relatively to the path of the tool to cause the tucking operation to be performed progressively, and means for introducing progressively a core piece into the groove of the matrix.

9. A machine for working sheet material into a groove in an insole-shaped matrix, said matrix having a rib groove in its marginal portion the walls of which are inclined inwardly with respect to the matrix, comprising a matrix support, a reciprocating tool acting in a direction substantially parallel to the walls of the groove, means for presenting a core piece above the work, and work-feeding means engaging the core piece and the work adjacent to the tool and at one side of the tool to feed the work and matrix whereby the tucking operation is performed progressively, the core piece inserted and the portion of the feeding means at the side of the tucking tool enables sharp toes to be rounded, said side portion at least maintaining feeding contact with the matrix while rounding a sharp toe.

10. A machine for forming an article from sheet material having, in combination, means for forcing a fold of sheet material into an inclined groove in a matrix, means for presenting a core piece having a flange thereon adjacent to the fold so formed, means for forcing a portion of the core piece into the fold with the flange outside of the fold, and means for wiping an adjacent portion of the flange inwardly of the matrix.

11. A machine for forming an article from sheet material having, in combination, means for forcing a fold of sheet material into a groove in a matrix, means for presenting a core piece having a flange thereon adjacent to the fold so formed, a four-motion feed foot for advancing the matrix and inserting the core piece in the fold, and a wiper carried by the feed foot for wiping the flange down upon the sheet material outside of the fold to draw the core piece against the inner wall of the groove.

12. A machine for forming an article of sheet material having, in combination, means for forcing a fold of sheet material into an inclined groove in a matrix, means for feeding a flanged core piece into a position adjacent to the fold so formed, means for forcing the core piece into the fold with the flange outside of the fold, and means for wiping the flange inwardly of the matrix.

13. A machine for forming an article from sheet material treated with thermoplastic material having, in combination, means for blowing hot air onto the sheet material to render it limp, means for forcing a fold of the sheet material into an inclined groove in a matrix, means for presenting a core piece having a flange thereon adjacent to the fold so formed, a four-motion feed foot for advancing the matrix and inserting a core piece in the fold, and a wiper carried by the feed foot for wiping the flange down upon the sheet material outside of the fold to draw the core piece against the inner wall of the inclined groove.

14. A machine for forming an article from sheet material having, in combination, means for forcing a fold of sheet material into an inclined groove in a matrix, means for presenting a core piece having a flange thereon adjacent to the groove so formed, means for forcing the core piece into the fold with the flange outside of the fold, and means for wiping the flange inwardly of the matrix.

15. A machine for forming an article from sheet material having, in combination, means for forcing a fold of sheet material into an inclined groove in a matrix, means for bending portions of a flat core piece at an angle to each other, means for presenting the core piece adjacent to the fold so formed, a four-motion feed foot for inserting one portion of the core piece into the fold, and a wiper carried by the feed foot for wiping the other portion of the core piece down upon the sheet material outside of the fold to draw the core piece against the inner wall of the inclined groove.

16. In a machine for working sheet material into a groove of a matrix, a tucking tool for forming in the groove a fold of the material, a four-motion feed foot, means for presenting a flanged core piece adjacent to the fold and feed foot, the feed foot acting to insert the core piece into the fold and to feed the matrix to cause progressive formation of the fold and insertion of the core piece, and a wiper carried by the feed foot and operating progressively to wipe inwardly the flange of the core piece.

17. A machine for forming an article from sheet material having, in combination, means for forcing a fold of sheet material into a groove in a matrix, means for presenting a core piece having a flange thereon adjacent to the fold so formed, means for forcing a portion of the core piece into the fold with the flange outside of the fold, a reciprocating wiper acting to lay a portion of the flange inwardly against the sheet material, and a plate adjacent to the wiper and extending edgewise across the flange to prevent the wiper from engaging the flange on its return movement.

18. In a machine for forming an article from sheet material, the combination of means for forcing a fold of sheet material into a groove in a matrix, means for presenting a core piece having a flange thereon adjacent to the fold so formed, means for inserting a portion of the core piece into the fold with the flange outside of the fold, a reciprocating wiper acting to lay the flange inwardly of the matrix, and a plate extending edgewise across the flange, said plate being mounted for slight movement whereby it holds the flange in position to be acted upon by the wiper without pressing the flange upon the sheet material.

19. In a machine for working sheet material into a groove of a matrix, a tucking tool for forming in the groove a fold of the material, a four-motion feed foot, means for conducting to the machine a flat core piece having thick and thin portions, means for forming the thin portion of the core piece at a right angle to the thick portion, means for feeding the core piece into position for the thick portion thereof to be pressed by the feed foot into the fold of material, and means for wiping the thin portion of the core piece inwardly of the matrix.

20. In a machine for working sheet material into a groove of a matrix, a tucking tool for forming in the groove a fold of the material, a four-motion feed foot, means for forming and presenting a flanged core piece adjacent to the fold and the feed foot, said feed foot acting to insert a portion of the core piece into the fold and to feed the matrix to cause progressive formation of the fold and insertion of the core piece, and a wiper operating in timed relation to the feed foot progressively to wipe inwardly the flange of the core piece located outside of the groove.

21. In a machine for working sheet material into a groove of a matrix, a tucking tool for forming in the groove a fold of the material, a four-motion feed foot for advancing the matrix, means for conducting to the machine a flat core piece having thick and thin portions, a creaser foot for forming the thin portions of the core piece at a right angle to the thick portion, a pawl for feeding the core piece into position to be pressed by the feed foot into the fold of material, and means for moving the creaser foot to form the core piece in conjunction with the feed movement of the pawl.

22. In a machine for working sheet material into a groove of a matrix, a tucking tool for forming in the groove a fold of material, a four-motion feed foot, means for flanging a core piece, means for presenting the flanged core piece adjacent to the fold on the feed foot, said feed foot acting to insert the core piece except the flange into the fold and to advance the matrix to cause progressive formation of the fold and insertion of the core piece, and a wiper operated in timed relation to the feed foot progressively to wipe inwardly the flange of the core piece.

23. In a machine for working sheet material into a groove of a matrix, a tucking tool for forming in the groove a fold of the material, a four-motion feed foot for advancing the matrix, an angular guide for conducting to the machine a flat core piece having thick and thin portions, means including a creaser foot for forming the thin portion of the core piece at a right angle to the thick portion, means for feeding the core piece into position for the thick portion thereof to be pressed by the feed foot into the fold of material, and a resilient wiper for wiping the thin portion of the core piece adjacent to the feed foot inwardly of the matrix.

24. A machine for forming an article from sheet material having, in combination, a matrix support, a tucking tool, means for reciprocating the tucking tool to force a fold of the material into the groove of a matrix on the support, a right-angular guide for a core piece, a feed foot for feeding the matrix, a creaser for pressing the core piece into the angle of the guide, and means for feeding the core piece into position over the fold to cause a portion thereof to be pressed by the feed foot into the fold.

25. A machine for working sheet material into a groove in an insole-shaped matrix, said matrix having a rib groove in its marginal portion, comprising a matrix support, a reciprocating tool for tucking the sheet material into the groove, work-feeding means acting on the work adjacent to the tucking tool, an angular guide for a core piece, a slide movable lengthwise of said guide, a feed pawl on the slide to feed the core piece, a creaser on the slide, and means acting when the slide is moved to advance the core piece for causing the creaser to press the core piece into the angle of the guide.

26. In a machine for tucking canvas into a groove in a grooved matrix to form a fold therein, means for forming a fold in the canvas, means for presenting a core piece having thick and thin portions, a creaser acting to dispose the portions of the core piece at substantially right angles to each other, means for feeding the core piece, means for feeding the matrix, and means for forcing the thick portion of the core piece into the fold in the canvas.

27. In a shoe machine, means for tucking canvas into a groove in a grooved matrix to form a fold therein, means for guiding a flat core piece having thick and thin portions, means for feeding the core piece, a creaser acting to dispose the portions of the core piece at right angles to each other, means for operating the creaser upon movement of the core piece-feeding means, means for feeding the matrix, and means for forcing the thick portion of the matrix into the fold in the canvas.

28. A machine for working sheet material into a groove in an insole-shaped matrix, said matrix having a rib groove in its marginal portion, comprising a matrix support, a reciprocating tool acting to tuck the material into the groove, work-feeding means engaging the work adjacent to the tool to feed the work and matrix whereby the tucking operation is performed progressively, an angular guide for a flat core piece, a slide movable relatively to the guide, a pawl on the slide for advancing the core piece, a creaser on the slide; and means operated by movement of the slide for causing the creaser to press the core piece into the angle of the guide.

29. A machine for forming an article from sheet material having, in combination, a matrix support for a grooved matrix, a tucking tool, means for reciprocating the tucking tool to force a fold of the material into the groove of the matrix, a feed foot for feeding the matrix, and means comprising a pawl having feed points for presenting a core piece over the fold to be pressed by the feed foot into the fold.

30. A machine for forming an article from sheet material having, in combination, a matrix support, a reciprocating tucking tool to force a fold of the material into the groove of a matrix on said support, means for presenting a core piece adjacent to the fold, a feed foot for feeding the matrix and pressing the core piece into the fold, and means comprising a pawl for feeding the core piece, said pawl having on its acting face needle points substantially inclined to the direction of feed.

31. A machine for forming an article from sheet material having, in combination, a support for a grooved matrix, a tucking tool, means for reciprocating the tucking tool to force a fold of the material into the groove of the matrix, a feed foot for feeding the matrix, and means for feeding the core piece comprising a reciprocating pawl having needle points inclined at an angle such that they enter the core piece when the pawl is moved in the direction of feed and slip out of the core piece when the pawl is moved in the opposite direction.

32. A machine for forming an article from sheet material having, in combination, a support for a grooved matrix, a tucking tool, means for reciprocating the tucking tool to force a fold of the material into a groove of the matrix, a feed foot for feeding the matrix, means comprising a reciprocating pawl having inclined feed points for presenting a core piece over the fold to be pressed by the feed foot into the fold, and means for yieldingly operating the pawl in timed relation to the feed foot.

33. A machine for forming an article from sheet material having, in combination, a support for a grooved matrix, a tucking tool, means for reciprocating the tool to form a fold of the material in a groove of the matrix, a four-motion feed foot for feeding the matrix, means comprising a reciprocating pawl having inclined feed points for presenting a core piece over the fold to be pressed by the feed foot into the fold, means for yieldingly operating the pawl, and means for imparting to the pawl feed movements in excess of those imparted to the feed foot.

34. A machine for forming an article from sheet material having, in combination, a support for a grooved matrix, a tucking tool, means for reciprocating the tucking tool to force a fold of the material into the groove of the matrix, a feed foot for feeding the matrix, a pawl for engaging and feeding a core piece, and means for operating the pawl in timed relation to the feed foot to present the core piece in position to be inserted into the fold by the feed foot.

35. A machine for forming an article from sheet material having, in combination, a support for a grooved matrix, a tucking tool, means for reciprocating the tucking tool to force a fold of the material into the groove of the matrix, a feed foot for feeding the matrix, a pawl for feeding a core piece, said pawl having needle points inclined at an angle such that they enter the core piece when the pawl is moved in the direction of feed and slip out of the core piece when the pawl is moved in the opposite direction, and means for reciprocating the pawl.

36. In a machine for tucking canvas into a groove in a grooved matrix to form a fold therein, a reciprocating tucking tool for forming the fold, a guide for a flat core piece having thick and thin portions, a reciprocating slide, a feed pawl on the slide for advancing the core piece, a creaser acting to dispose the thick and thin portions of the core piece at right angles to each other, and connections for operating the creaser to cause the core piece to be bent during the feed movement of the pawl.

37. In a machine for tucking sheet material into grooves in opposite faces of an insole-shaped matrix, the combination of a reciprocating tool for tucking the material into a groove in one side of the matrix, a depressible support positively supported to maintain the matrix at a suitable height for the tucking operation on the first side of the matrix, and means acting automatically upon depression and release of the work support to positively position the support at a lesser height for performing the tucking operation on the second side of the matrix.

38. A machine for applying sheet material first to one side of a work piece and then to the other side comprising a support for the work, means for positioning the support first at a height suitable for applying material to the first side of the work piece, and means operated without attention on the part of the operator for positioning the work support at a lower level when the material is applied to the second side of the work piece to compensate for the thickness of the material applied to the first side.

39. In a machine for applying sheet material first to one side of a member of uniform thickness and then to the other side thereof, a support for the member, and means to locate the support first at one height for application of the material to the first side of the member and then at a lesser height to support the member for application to the second side thereof, the difference in height corresponding substantially to the thickness of the material applied.

40. In a machine for tucking sheet material into inwardly inclined grooves in opposite faces of an insole-shaped matrix, the combination of a reciprocating tool operating in a direction parallel to the walls of the groove, means for advancing the matrix, a rigidly held support for the matrix to hold it at a height suitable for tucking the material into the groove on the first side of the matrix, means for depressing the support to allow the matrix to be removed and turned over, and means operating automatically when the support is raised to support the matrix for the tucking operation on the second side for locating the support at a lesser height to compensate for the thickness of the material applied to the first side of the matrix.

41. A machine for applying sheet material to one side at a time of an insole-shaped matrix having a rib groove in each face, comprising a support for the matrix, means for tucking the sheet material into the groove on one side of the matrix, means for positioning the support first at a height suitable for tucking material into the groove on the first side of the matrix, and means operated without attention on the part of the operator for positioning the matrix support at a lower level when the material is tucked into the groove on the second side of the matrix to compensate for the thickness of the material applied to the first side thereof.

42. In a machine for applying sheet material first to one side of an insole-shaped matrix of uniform thickness and then to the other side thereof, said matrix having a rib groove in each face, a support for the matrix, means for working the sheet material into the groove first on one side and then on the other, and means to locate the support first at one height for tucking the material into the groove on the first side of the matrix and then at a lesser height to support the matrix for tucking the material into the groove on the second side thereof, the difference in height corresponding substantially to the thickness of the material applied.

43. A machine for applying sheet material first to one side of a work piece and then to the other comprising means for applying sheet material to one side of the work piece, a work support, means comprising an inverted toggle having a long and a short link for rigidly sustaining the support, bending of the toggle causing the support to descend, a pin for supporting the end of the short link which end is remote from the joint of the toggle, a prismatic member on which the support rests, said member being secured to said pin, a ratchet wheel on said pin, and a spring-pressed pawl on said short link to engage the ratchet wheel and turn the prism when the toggle is straightened, the pawl acting alternately to present a corner of the prism and a flat side thereof, thus to present the work support alternately at different heights.

44. A machine for tucking sheet material into a groove first on one side of an insole-shaped matrix and then on the other comprising a reciprocating tucking tool for tucking the sheet material into a groove of the matrix, a matrix support, means for advancing the matrix, means comprising an inverted toggle having a long and a short link for rigidly sustaining the support, bending of the toggle causing the support to descend, a pin supporting the end of the short link which is remote from the joint of the toggle, a prismatic member fixed to said pin, a ratchet wheel on said pin, and a spring-pressed pawl pivoted on the short link to engage the ratchet wheel and turn the prismatic member when the toggle is straightened, the pawl acting to first present a corner of the prismatic member to hold the support at the height proper for tucking the material into the groove on the first side of the matrix, said pawl acting, when the support is lowered to permit the matrix to be turned over and raised to support it for operation on the second side, to turn the prismatic member to present a flat side thereof for sustaining the work support at the proper height for performing the tucking operation on the second side of the matrix.

HANS C. PAULSEN.

No references cited.

Certificate of Correction

Patent No. 2,494,578                                January 17, 1950

HANS C. PAULSEN

It is hereby certified that error appears in the printed specification of the above numbered patent requiring correction as follows:

Column 13, line 16, for the word "effective" read *effecting*;

and that the said Letters Patent should be read with this correction therein that the same may conform to the record of the case in the Patent Office.

Signed and sealed this 15th day of August, A. D. 1950.

[SEAL]

THOMAS F. MURPHY,
                                            *Assistant Commissioner of Patents.*